United States Patent
Ivey et al.

(10) Patent No.: US 7,647,342 B2
(45) Date of Patent: Jan. 12, 2010

(54) SYSTEM AND METHOD FOR AUTOMATICALLY GENERATING A SLATE USING METADATA

(75) Inventors: Matthew Albert Ivey, Portland, OR (US); John Robert Naylor, Portland, OR (US); James Edward Pearce, Portland, OR (US)

(73) Assignee: Thomson Licensing, Boulogne-Billancourt (FR)

( * ) Notice: Subject to any disclaimer, the term of this patent is extended or adjusted under 35 U.S.C. 154(b) by 367 days.

(21) Appl. No.: 10/551,083

(22) PCT Filed: Mar. 4, 2004

(86) PCT No.: PCT/US2004/006672

§ 371 (c)(1),
(2), (4) Date: Sep. 27, 2005

(87) PCT Pub. No.: WO2004/095345

PCT Pub. Date: Nov. 4, 2004

(65) Prior Publication Data

US 2006/0218183 A1    Sep. 28, 2006

Related U.S. Application Data

(60) Provisional application No. 60/458,653, filed on Mar. 28, 2003.

(51) Int. Cl.
*G06F 7/00* (2006.01)
(52) U.S. Cl. .................................. 707/104.1
(58) Field of Classification Search .................. 707/3, 707/10, 104.1, 101; 709/219, 226, 231; 725/40, 725/45, 87, 93
See application file for complete search history.

(56) References Cited

U.S. PATENT DOCUMENTS 5,861,906 A    1/1999 Dunn et al.
6,314,577 B1   11/2001 Pocock (Continued)

FOREIGN PATENT DOCUMENTS

EP    0848554    6/1998

OTHER PUBLICATIONS

Search Report Dated Aug. 4, 2004.

*Primary Examiner*—Wilson Lee
(74) *Attorney, Agent, or Firm*—Robert D. Shedd; Harvey D. Fried; Joel M. Fogelson

(57) ABSTRACT

A system and corresponding methods are provided for enabling the automatic generation of a slate using metadata. The method comprises the steps of: receiving a request to provide a user with a list of video media assets so the user can select a video media asset to generate a slate; providing the user with the list of video media assets and receiving a selected video media asset from the user; acquiring metadata associated with the selected video media asset, creating a preview of the slate by generating fields that are associated with the acquired metadata, generating the slate in response to the user's approval of the previewed slate; transmitting the slate to a video server; and editing the slate into the selected video media asset so the slate and the video media asset can be viewed in conjunction with each other, thereby providing the user (via the slate) with information about the video media asset such as the video media asset's name, duration, database location, etc.

20 Claims, 4 Drawing Sheets

U.S. PATENT DOCUMENTS

| | | | |
|---|---|---|---|
| 6,374,260 B1 * | 4/2002 | Hoffert et al. | 707/104.1 |
| 2002/0053085 A1 | 5/2002 | Toguri | |
| 2002/0073422 A1 * | 6/2002 | Lee | 725/40 |
| 2002/0152318 A1 | 10/2002 | Menon et al. | |
| 2002/0166123 A1 | 11/2002 | Schrader et al. | |
| 2002/0194480 A1 | 12/2002 | Nagao | |
| 2004/0003403 A1 * | 1/2004 | Marsh | 725/53 |
| 2004/0128317 A1 * | 7/2004 | Sull et al. | 707/104.1 |

* cited by examiner

| MOVIE NAME | ☑ | WATERMARK DISPLAYED EVERY | 00 H 30 M 00 S |
| MOVIE DURATION | ☐ | WATERMARK DISPLAY DURATION | 00 H 00 M 10 S |
| ENCODING | ☐ | RANDOMIZE METADATA DISPLAY | YES |
| RESOLUTION | ☐ | RANDOMIZE TIME METADATA DISPLAYED | YES |
| COPYRIGHT DATE | ☑ | RANDOMIZE METADATA DISPLAY DURATION | YES |
| DIRECTOR | ☑ | | |
| ACTORS | ☐ | | |
| TAKE | ☐ | | |

| FILM COPY NUMBER | FIRST METADATA USED | SECOND METADATA USED | DISPLAYED EVERY | DISPLAY DURATION |
|---|---|---|---|---|
| 1 | MOVIE NAME | ACTORS | 10 MINUTES | 10 SECONDS |
| 2 | ACTORS | ENCODING | 5 MINUTES | 30 SECONDS |
| 3 | ENCODING | MOVIE NAME | 10 MINUTES | 20 SECONDS |
| 4 | COPYRIGHT | ENCODING | 30 MINUTES | 20 SECONDS |
| 5 | MOVIE NAME | COPYRIGHT | 5 MINUTES | 10 SECONDS |
| 6 | ENCODING | ACTORS | 10 MINUTES | 30 SECONDS |
| 7 | ACTORS | MOVIE NAME | 45 MINUTES | 1 MINUTE |

FIG. 5

SYSTEM AND METHOD FOR AUTOMATICALLY GENERATING A SLATE USING METADATA

This application claims the benefit, under 35 U.S.C. § 365 of International Application PCT/US2004/06672, filed Mar. 4, 2004, which was published in accordance with PCT Article 21(2) on Nov. 4, 2004 in English and which claims the benefit of U.S. provisional patent application No. 60/458,653, filed Mar. 28, 2003.

FIELD OF THE INVENTION

The present invention relates to automatically generating a slate and, more particularly, to a system and method for automatically generating a slate using metadata stored on a media server.

BACKGROUND OF THE INVENTION

In order to manage large collections of media assets such as video and audio data, segments of such media assets are associated with metadata to enable the retrieval of such data from, for example, a media server in which the data is stored. The metadata that is associated with such data typically provides information about the data such as the data's elements or attributes (e.g., name, size, type), records or structures (e.g., length, fields, columns) and data about the data (e.g., where it is located, how it is associated, ownership).

In order to acquire information provided by the metadata about a desired video based media asset such as a video media asset, a user can query the media server for this information. This information, although helpful, is not typically viewed in conjunction with the video media asset. To view this information in conjunction with the video media asset a slate can be created, which includes information about the video media asset, to appear prior to viewing the video media asset. The information on the slate, however, must be entered manually by a user in a time consuming process. In addition, the production of a slate requires expensive video equipment such as a character generator and a time code generator, etc.

Accordingly, there is a need for a system and method for automatically generating a slate in a short period of time at a relatively inexpensive cost.

SUMMARY OF THE INVENTION

These and other drawbacks and disadvantages of the prior art are addressed by a system and method for automatically generating a slate using metadata. A system and corresponding methods are provided for enabling the automatic generation of a slate using metadata.

In one embodiment of the present invention, a method for automatically generating a slate using metadata, comprises: receiving a request to generate a slate, wherein the request is associated with a selected video based media asset; and generating the slate using metadata associated with the selected video media asset.

In another embodiment of the present invention, an apparatus for presenting metadata on a video-slate, wherein the metadata is in a text format, comprises: a memory device for storing a program; a processor in communication with the memory device, the processor operative with the program to: receive a request to generate a slate, wherein the request is associated with a selected video media asset; and generate the slate using metadata associated with the selected video media asset.

In yet another embodiment of the present invention, a system for automatically generating a slate using metadata, comprises: means for receiving a request to generate a slate, wherein the request is associated with a selected video media asset; and means for generating the slate using metadata associated with the selected video media asset.

In another embodiment of the present invention, a computer program product comprising a computer useable medium having computer program logic recorded thereon for automatically generating a slate using metadata, the computer program logic comprises: program code for receiving a request to generate a slate, wherein the request is associated with a selected video media asset; and program code for generating the slate using metadata associated with the selected video media asset.

In yet another embodiment of the present invention, a method for presenting metadata on a slate that is viewable as a video stream, comprises: receiving a request to provide a user with a list of video media assets so the user can select a video asset to have a slate generated; providing the list of video media assets to the user, wherein the list of video media assets is acquired from a media database in a media server; receiving a selected a video media asset from the user; acquiring metadata associated with the selected video media asset, wherein the metadata is acquired from a metadata database in the media server; creating a preview of the slate, wherein the preview is created by generating fields that are associated with the acquired metadata; generating the slate in response to the user's acceptance of the preview, wherein the slate is converted into a video stream; transmitting the video stream to the media server; and editing the video stream into the selected video media asset so that the video stream can be viewed in conjunction with the selected video media asset.

In a further embodiment of the present invention, a watermarking system is presented for using metadata to designate copies of a video media asset, wherein the metadata is presented on screen with the video at different times and for different durations, for each copy of the video media asset.

BRIEF DESCRIPTION OF THE DRAWINGS

The present invention may be better understood in accordance with the following exemplary figures, in which:

FIG. 5 is an exemplary embodiment of a table used for indicating the metadata used for watermarking copies of a video media asset.

DETAILED DESCRIPTION OF EXEMPLARY EMBODIMENTS

Figure 1:
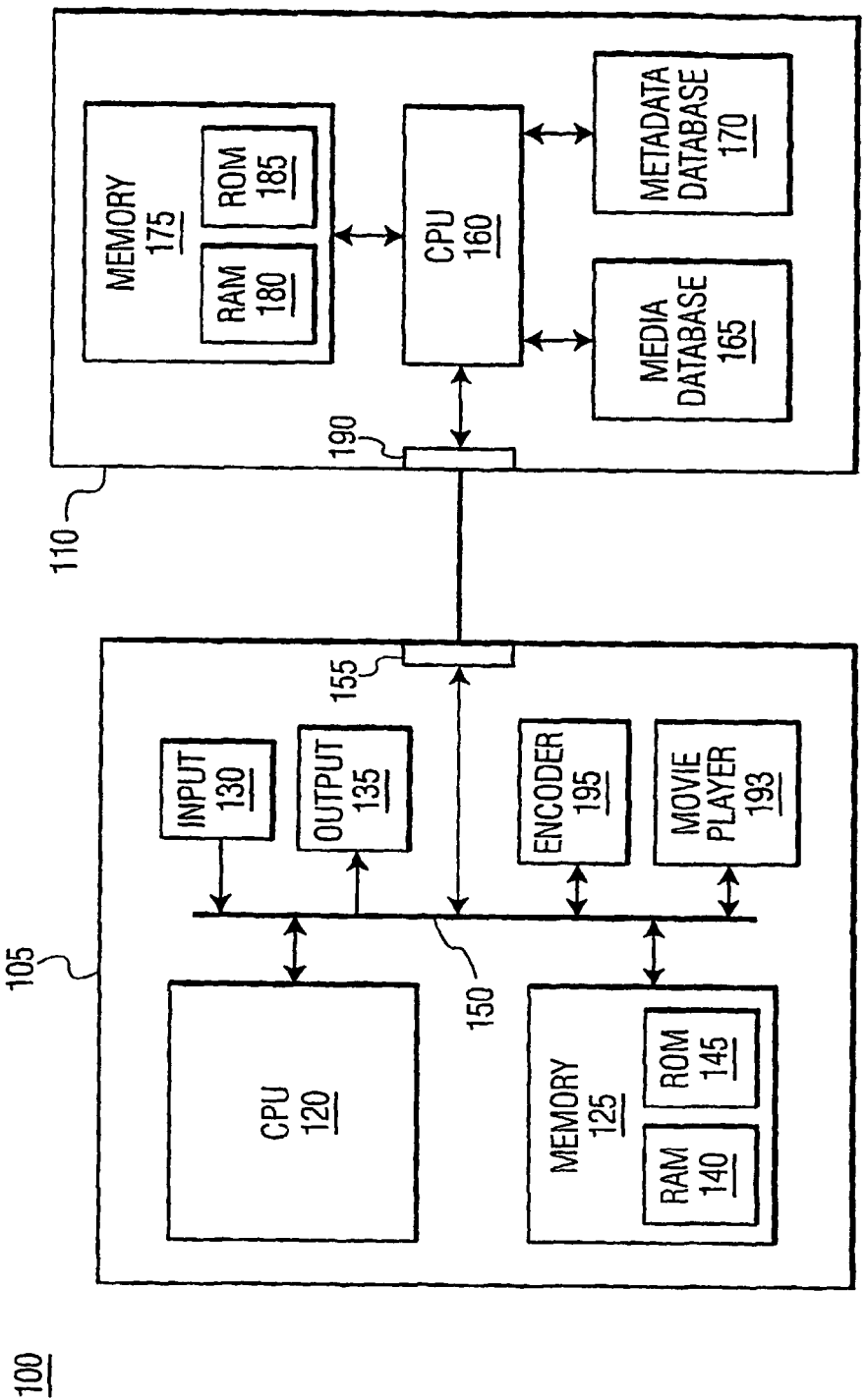
FIG. 1 is a block diagram of a system for automatically generating a slate using metadata according to an exemplary embodiment of the present invention.

FIG. 1 is a block diagram of a system 100 for automatically generating a slate using metadata according to an exemplary embodiment of the present invention. As shown in FIG. 1, the system 100 includes a personal computer (PC) 105 and a media server 110 connected together by a network 115 via network connection interfaces 155, 190, respectively.

The PC 105, which may be a portable or laptop computer, a personal digital assistant (PDA), etc., includes a central processing unit (CPU) 120 and a memory 125, which are connected to an input 130 and an output 135 via a data bus 150. The memory 125 includes a random access memory (RAM) 140 and a read only memory (ROM) 145. The memory 125 can also include a database, disk drive, tape drive, etc., or a combination thereof. The RAM 140 functions as a data memory that stores data used during execution of a program in the CPU 120 and is used as a work area. The ROM 145 functions as a program memory for storing a program executed in the CPU 120. The input 130 is constituted by a keyboard, mouse, connecting means, etc., and the output 135 is constituted by a liquid crystal display (LCD), cathode ray tube (CRT) display, printer, etc.

The PC 105 also includes a media player 193 and an encoder 195 connected to the PC's 105 internal components via the data bus 150. The media player 193 is used to play video media assets and/or video streams that are selected by a user. The media player 193 may include a decoder to decode a video signal provided by the media server 110 with the assistance of the PC's 105 internal components and it may display the video signal on the output 135 such as a CRT monitor. The encoder 195, which employs binary or ASCII encoding schemes, encodes the video signal used by the media player 193 so that it may be transmitted to the media server 110 for additional modification. The format of the video signal may be any of a variety of formats such as Real Video, MPEG, JVT, Apple QuickTime, Microsoft AVI, any type of cable, terrestrial, or modem based video standard, etc.

The media server 110 includes a CPU 160 connected to a media database 165, a metadata database 170 and a memory 175. Similar to the memory 125 of the PC 105, the memory 175 of the media server 110 includes a RAM 180 and a ROM 185. The memory 175 can also include an internal or external database, disk drive, tape drive, etc., or a combination thereof. The RAM 180 functions as a data memory that stores data used during execution of a program in the CPU 160 and is used as a work area. The ROM 185 functions as a program memory for storing a program executed in the CPU 160. It is to be understood that the databases 165, 170 and the memory 175 can be connected to the CPU 160 via a common data bus.

The media database 165 includes collections of video streams of video media assets such as film, television shows, and other video programming that can be selected by a user. The metadata database 170 includes metadata associated with the video streams in the media database 165. The metadata includes information for sundry items associated with the video streams in media database 165 such as, video format, encoding format, duration, mark-in, mark-out, title, date recorded, actors, director, take number, copyright date etc. It is to be understood that media database 165 and the metadata database 170 can be combined to form one database that includes the information found in each of the databases 165, 170. It is also to be appreciated that "take number" metadata represents the take of the film, where a take is one of a series of shots of the same scene. The order of the shot in the sequence represents the "take number".

Figure 2:
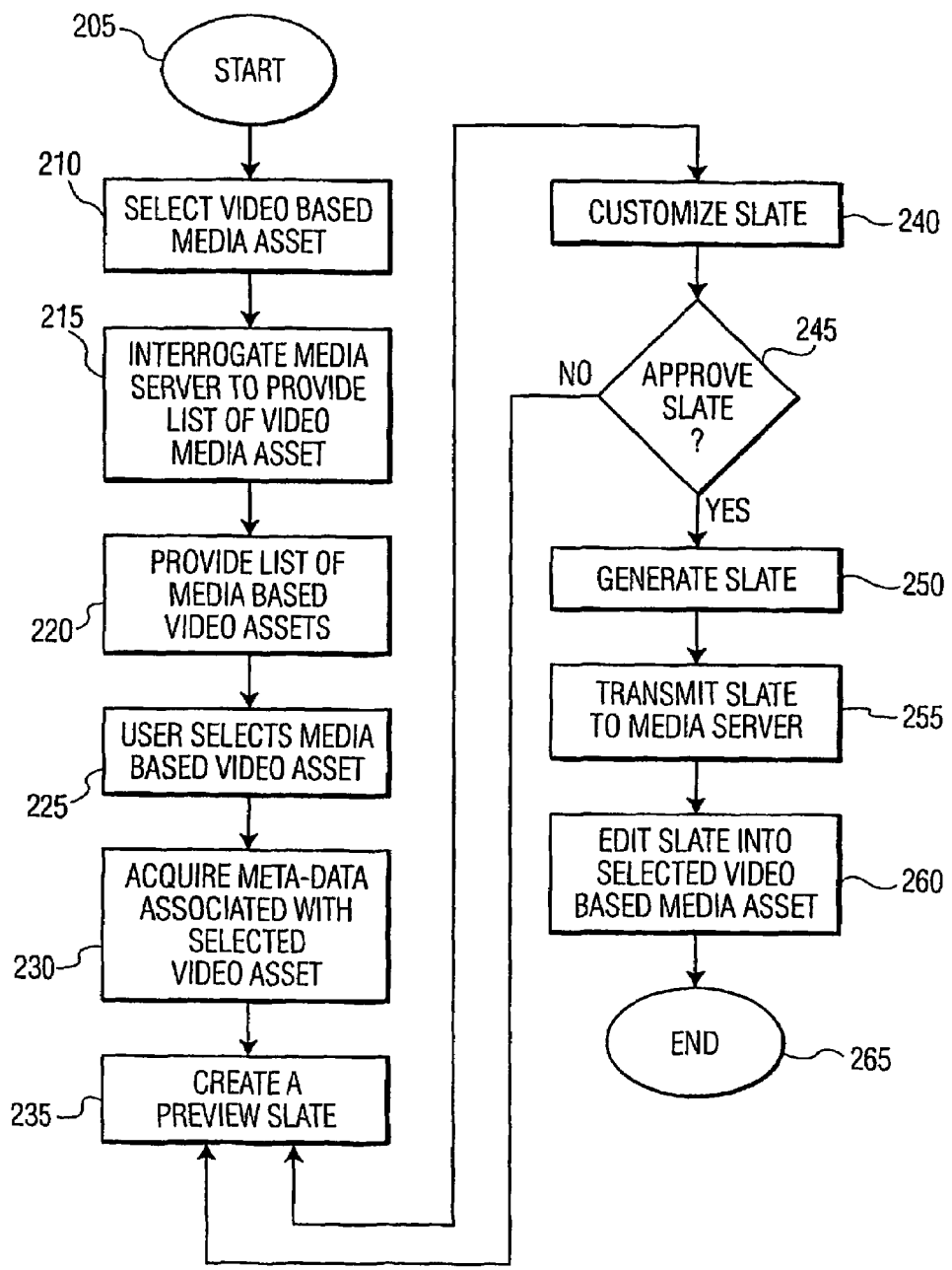
FIG. 2 is a flowchart showing an operation of a system for automatically generating a slate using metadata according to an exemplary embodiment of the present invention.

FIG. 2 is a flowchart showing an operation of a system for automatically generating a slate using metadata according to an exemplary embodiment of the present invention. As shown in FIG. 2, a user launches an application embodying the present invention on, for example, the PC 105, which is connected to the media server 110 (step 205). The user subsequently indicates a desire to select a video media asset for automatically generating a slate (step 210). This is accomplished by clicking an icon associated with selecting a video media asset on, for example, a CRT display in communication with the PC 105. The application then interrogates the media server 110 to provide a list of video media assets to the user (step 215). The media server 110, then accesses, for example, its media database 165 and provides a list of video media assets to the user that are viewable on the CRT display (step 220). The user subsequently selects a video media asset named, for example, "mymovie" for automatically generating a slate (step 225). It is to be understood that a slate, which may also be referred to as an auto-slate, title screen, video-slate or a video-clapper, is a video image or video stream which is used to present information (provided by metadata) that is associated with a video based media asset such as movie and will be further described with reference to FIGS. 2 and 3.

As shown in FIG. 2, the media server 110 then accesses the contents of its metadata database 170 associated with the selected video based media asset such as a movie and provides metadata to the application running on the PC 105 (step 230). It is to be understood that the metadata, which is provided by the media server 110, can be associated with the video media asset's video format, encoding format, duration, mark-in, mark-out, title, date recorded, etc. Upon receipt of the metadata associated with the selected video media asset the application creates a preview of the slate (step 235). It is to be understood that the preview can be a still image or an animation that shows what the slate will look like (absent the acquired metadata) when pre-appended to the selected video media asset. It is to be further understood that in an alternative embodiment of the present invention the preview slate can be generated to display the metadata in a text format. In a further embodiment of the present invention, the metadata provided may be modified in accordance with the preferences of a user. For example, instead of using format and encoding format for metadata, a user may designate that actors and director represent replacement metadata fields that are used for generating the slate.

The preview is created using, for example, standard graphical libraries provided by the operating system of the CPU 105 or the media server 110 and fields are presented to the user that are associated with the acquired metadata. It is to be understood that fields, which are not associated with the acquired metadata are also presented on the preview. After the slate is previewed the user has the option to customize the slate (step 240). The user may customize the slate by modifying its properties to change its appearance (e.g., change its background color), select its size, select its timing, add text, add countdown timers, add metadata variables (e.g., clip name or encoding type), etc. This enables a user to create a slate having a "house style," which is, for example, a template that can be used for all slates generated by the same user for purposes of uniformity and ease of identification.

After the slate is customized the user determines whether to approve the slate (step 245). If the user approves the previewed slate, the slate is generated (step 250). If, however, the user does not approve of the previewed slate: 1) the application returns to the preview of the original slate in step 235, 2) the user continues to modify the slate, or 3) the user opts to end the process and exits the application. When the slate is generated in step 250 several procedures take place.

First, the slate is rendered one frame at a time with its associated metadata in a format that may be specified by the user in, for example, the customization step 240. It is to be understood that the slate can be formatted for a number of television sizes used by, for example, the national televisions standard committee (NTSC), phase alternation line (PAL) or high-definition television (HDTV), etc. Second, the rendered frames are compressed by, for example, the encoder 195. Finally, the compressed frames and their associated timecodes (e.g., Society of Motion Picture and Television Engineers (SMPTE) and European Broadcasting Union (EBU) times codes) are converted to a video stream in conformance with a general exchange format (GXF) such as the SMPTE360M standard or an advanced authoring format (AAF), etc. It is also to be appreciated that the generated slate and corresponding time codes can be used to automatically queue video playback systems for use in an automated broadcast video system.

As further shown in FIG. 2, after the slate is generated it is transmitted to the media server 110 and stored in the media database 165 (step 255). Thus, for example, the slate is stored in the media database under the name "mymovie_slate." Subsequently, the user edits the slate "mymovie_slate" into the selected video media asset "mymovie" to create a video media asset that includes the slate attached to the beginning of the original video media asset named, for example, "mymovie with_slate," thereby causing the impression that the original video media asset has been pre-appended with the slate (pre-appending meaning that that the slate is put before the original video media asset) (step 260). After the editing step 260, the user may end the application (step 265) or begin again by querying the application to provide a list of video media assets for automatically generating slates. This querying step may alternative be a search for matching metadata as inputted by a user, as to match video with corresponding metadata. For example, a user could input a query to find video associated a particular actor or director, or the like.

Figures 3, 4:
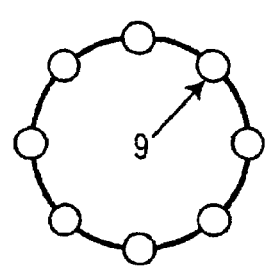
FIG. 3 is a still image of an automatically generated slate according to an exemplary embodiment of the present invention.
FIG. 4 is an exemplary embodiment of a user interface used for designating a watermark using metadata according to an exemplary embodiment of the present invention.

FIG. 3 is a still image of slate 300 that is automatically generated according to an exemplary embodiment of the present invention. As shown in FIG. 3, the slate 300 includes a user selectable background, which is used, for example, to identify television stations, companies, product logos, etc. The option of having a custom background enables "house styles" to be easily chosen, configured and identified by use of an user interface or other means as known in the art. The slate 300 also includes a countdown timer in the lower right hand corner (shown with a "9" in its center), which is used to count down to the beginning of the video media asset to which the slate is pre-appended. It is to be understood that the countdown timer can specify the life of the slate.

As further shown in FIG. 3, the slate 300 includes a column that lists the following identifiers: Movie Name, Location, Duration, Encoding, Resolution, In-point and Out-point. The identifiers are customized to provide a user with desired information about the video media asset that is identified by the slate 300. The metadata associated with the video media asset is presented as text in the column next to the identifiers. As shown in FIG. 3, the metadata associated with the Movie Name is "FootballHighlights," Location is "\\Ext\Default," Duration is "00:31:00:00," Encoding is "MPEG2 4:2:2 10 Mb/s IBP," Resolution is "PAL," In-Point is "00:00:30:00" and Out-Point is "00:30:30:00." Thus, the video media asset named "Football Highlights" is stored in a file called "FootballHighlights," lasts 31 minutes, has been edited to have an In-point and an Out-point 30 seconds before/after the start/end of the video media asset and appears before the video media asset proper. The video media asset also has a PAL resolution and MPEG2 encoding. It is to be understood that additional metadata associated with the video media asset can be presented on the slate 300, as selected by a user.

It is to be appreciated that the metadata used for generating a slate may alternatively be used be inserted into the user or auxiliary data fields of a video media asset, such as accommodated in the user data fields of an MPEG-2 stream, or accompany a video stream as part of a private data stream. In this alternative embodiment, the creation of slate data can be done at the point of the device that receives a video media asset and the corresponding metadata can generate a slate in accordance with the principles of the present invention. This alternative embodiment would not require the appendage of extra video footage representative of the slate, as the generation of the slate is done at the point where video would be edited, or received.

A further embodiment of the invention is presented where the metadata associated with the slate is used for security purposes, as to watermark the video media asset being associated with the slate. For example, a user upon selecting the attributes of the slate designates an option via PC 105 of having the metadata being displayed at different times of the video media asset, as to produce a watermark that is rendered as text/graphics overlaying the video representing the film. As shown in FIG. 4 in accordance with an exemplary embodiment of the present invention, the user specifies via a user interface 400 what metadata is to be displayed, such as video media asset name, copyright date, etc., and at what duration in the film and for how long such metadata is to be displayed. In this present example, the user specifies that metadata is to be displayed every thirty minutes for a ten-second duration. Both of these time values are modifiable in accordance with the preferences of the user.

If the user is to make multiple of copies of the film, with associated watermarks, the user may specify that the PC 105 randomize the use of what metadata is used for the watermark and at what times and for how long such metadata is displayed. Using these variations, a unique combination of metadata and duration of the display of metadata is used to distinguish each video media asset copy from one another. The pattern of metadata randomization is stored in a table as shown in FIG. 5, as generated by PC 105. Table 500 designates an illustrative embodiment what metadata (or metadata fields) the computer selected to generate a copy, and for what duration and for how long such metadata was shown on screen with the video of a film. A filmmaker then can view the video media asset with the information in the table to determine if a generated copy of the video media asset was being illicitly distributed. The entries in the table and the amount of fields used to watermark video media assets may be modified in accordance with the principles of the present invention and the preferences of a user.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

What is claimed is:

1. A method for automatically generating a video slate using metadata, the method comprising:

receiving a request to generate a video slate, where-the request is associated with a selected video media asset, wherein said selected video media asset is representative of a take which is one of a series of shots of a same scene;

automatically associating a take number with said selected video media asset where said take number corresponds to the order of said video asset in said series of shots; and generating the video slate which is capable of being displayed using metadata associated with the selected video media asset which includes said take number.

2. The method of claim 1, further comprising:
providing a list of video media assets to a user so the user can select a video media asset to have a video slate generated.

3. The method of claim 1, further comprising:
acquiring metadata associated with the selected video media asset.

4. The method of claim 3, further comprising:
creating a preview of the video slate, wherein the preview is created by generating fields that are associated with the acquired metadata.

5. The method of claim 4, further comprising:
adjusting the preview of the video slate in response to the user.

6. The method of claim 5, wherein the properties of the previewed video slate are adjusted.

7. The method of claim 5, further comprising:
receiving an acceptance of the preview, wherein the video slate is generated after receiving the acceptance.

8. The method of claim 1, wherein the generating step further comprises:
rendering frames of the video slate with its associated metadata;
compressing the frames of the video slate; and
converting the compressed frames into a video stream.

9. The method of claim 8, wherein the compressed frames are converted into a video media asset stream using a general exchange format.

10. The method of claim 8, further comprising:
sending the video stream to a server for storage.

11. The method of claim 8, further comprising:
editing the video stream into the selected video media asset where said video stream is appended before said selected video asset.

12. An apparatus for presenting metadata on a video-slate wherein the metadata is in a text format, the apparatus comprising:
a memory device for storing a program;
a processor in communication with the memory device, the processor operative with the program to:
receiving a request to generate a slate, wherein the request is associated with a selected video media asset such that said selected video media asset is representative of a take which is one of a series of shots of a same scene;
automatically associating a take number with said selected video media asset where said take number corresponds to the order of said video asset in said series of shots;
generating the video slate which is capable of being displayed using metadata associated with the selected video media asset which includes said take number.

13. The apparatus of claim 12, the processor further operative with the program to:
provide a list of video media assets to a user so the user can select a video media asset to have a slate generated.

14. The apparatus of claim 12, the processor further operative with the program to:
acquire metadata associated with the selected video media asset.

15. The apparatus of claim 14, the processor further operative with the program to:
create a preview of the slate, wherein the preview is created using fields that are associated with the acquired metadata.

16. The apparatus of claim 15, the processor further operative with the program to:
adjust the preview of the slate in response to the user.

17. The apparatus of claim 15, the processor further operative with the program to:
receive an acceptance of the preview, wherein the slate is generated after receiving the acceptance.

18. The apparatus of claim 12, the processor further operative with the program to:
transmit the generated slate to a server for storage.

19. The apparatus of claim 12, the processor further operative with the program to:
edit the generated slate into the selected video media asset.

20. A method of using the metadata of the method of claim 1 to watermark a copy of the selected media video asset wherein the order of metadata that is shown for a respective take and a time duration metadata is displayed is modified from take to take.

* * * * *

UNITED STATES PATENT AND TRADEMARK OFFICE
CERTIFICATE OF CORRECTION

PATENT NO.        : 7,647,342 B2                                              Page 1 of 1
APPLICATION NO.   : 10/551083
DATED             : January 12, 2010
INVENTOR(S)       : Ivey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 614 days.

Signed and Sealed this

Sixteenth Day of November, 2010

David J. Kappos
*Director of the United States Patent and Trademark Office*